Figure 1:
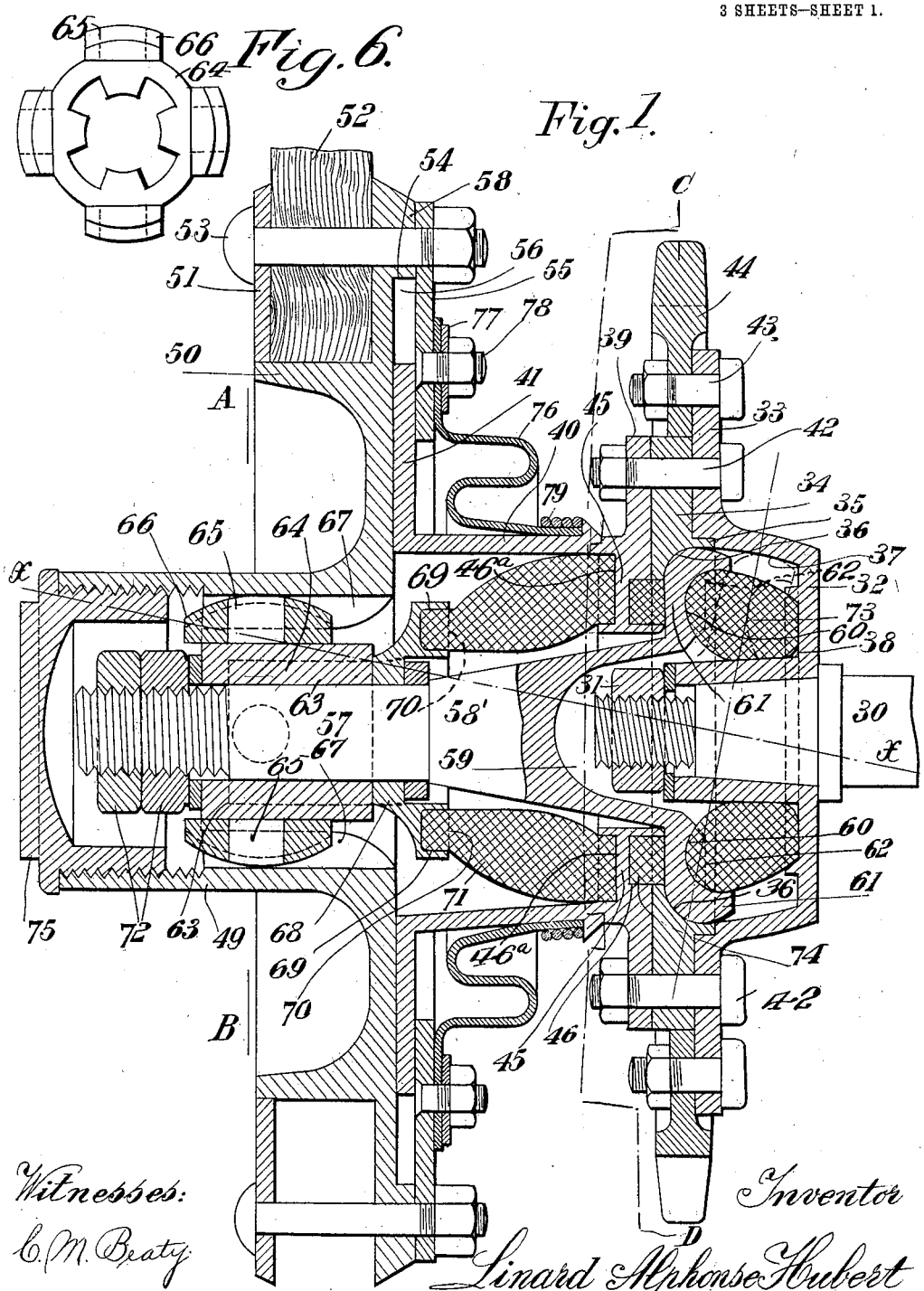

L. A. HUBERT.
ELASTIC WHEEL.
APPLICATION FILED SEPT. 30, 1909.

1,039,538.

Patented Sept. 24, 1912.

3 SHEETS—SHEET 1.

L. A. HUBERT.
ELASTIC WHEEL.
APPLICATION FILED SEPT. 30, 1909.
1,039,538.
Patented Sept. 24, 1912.
3 SHEETS—SHEET 2.
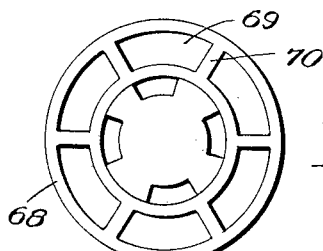
Fig.2.
Fig.3.
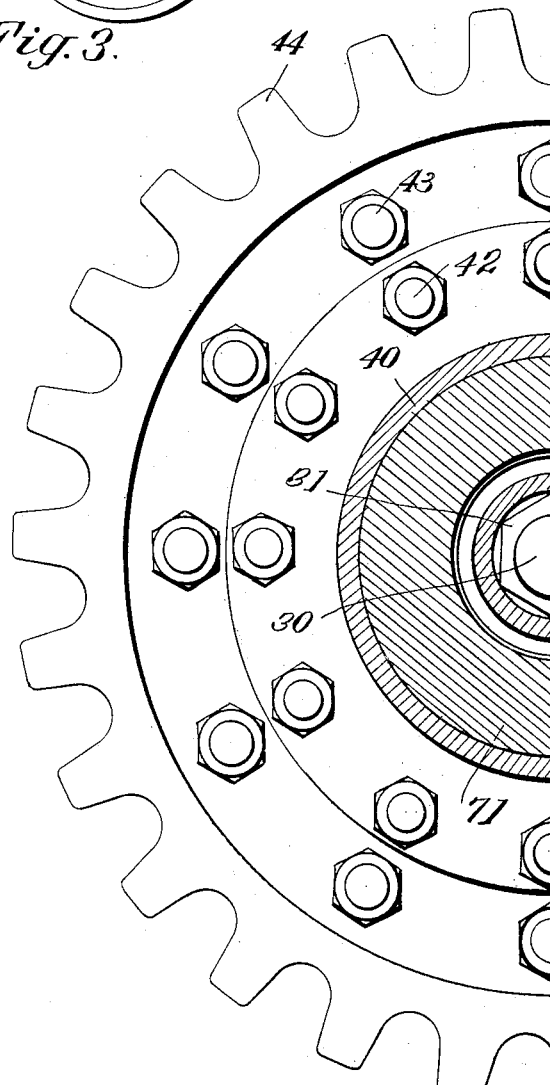
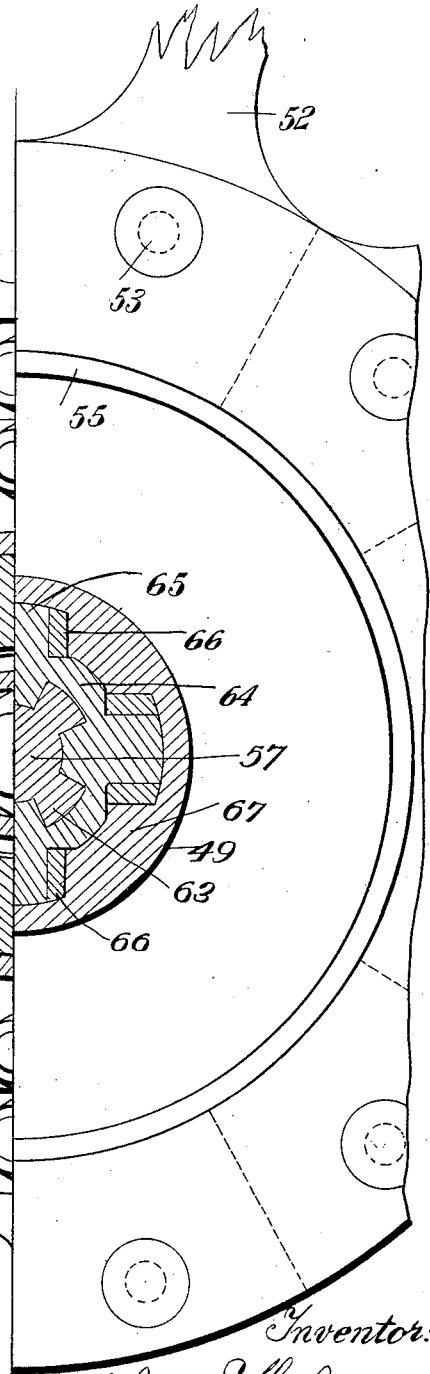
Witnesses:
C. M. Baty
B. P. Fishburne
Inventor:
Linard Alphonse Hubert
by B. Singer, Attorney

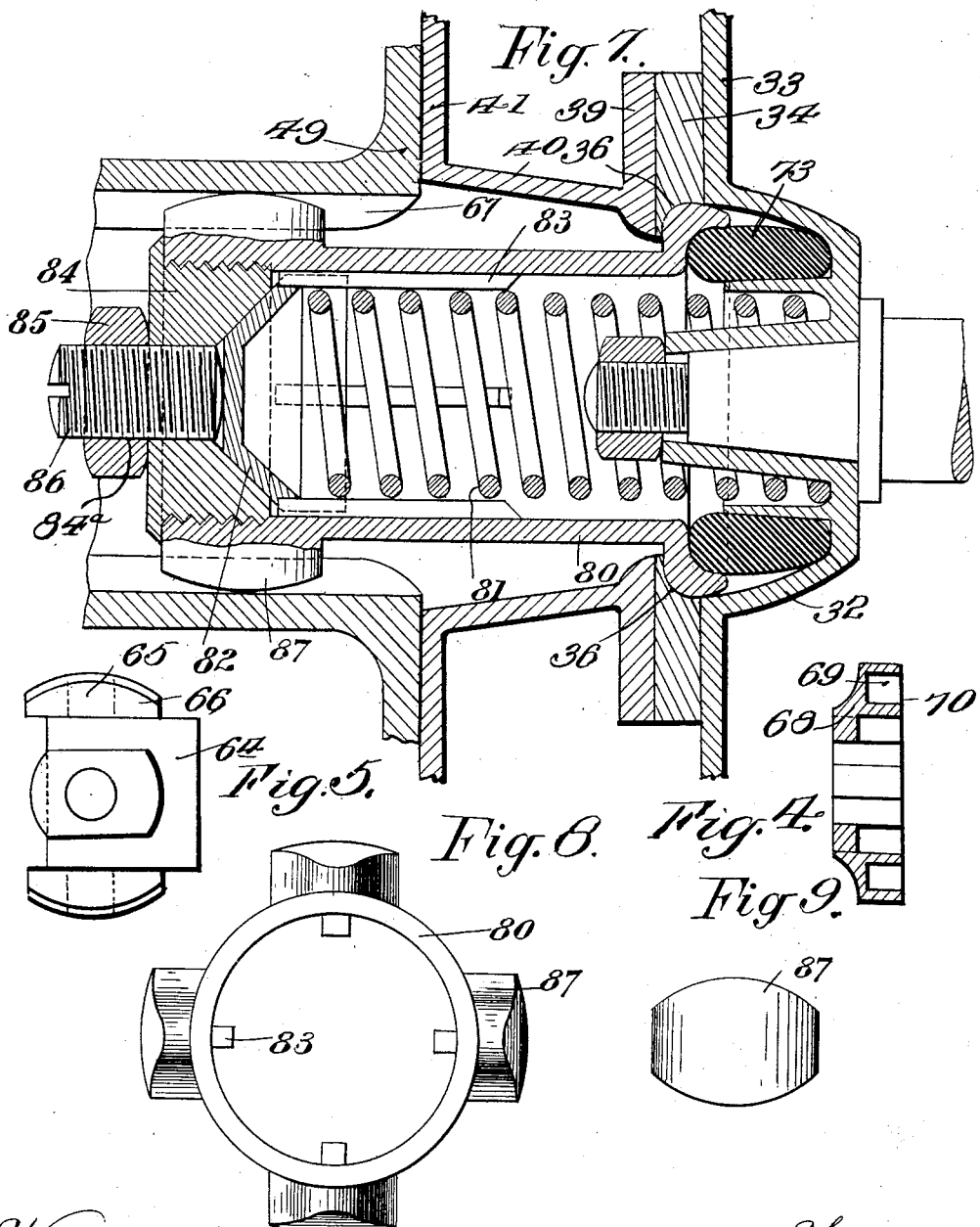

UNITED STATES PATENT OFFICE.

LINARD ALPHONSE HUBERT. OF TROYES, FRANCE.

ELASTIC WHEEL.

1,039,538.  Specification of Letters Patent.  Patented Sept. 24, 1912.

Application filed September 30, 1909. Serial No. 520,333.

*To all whom it may concern:*

Be it known that I, LINARD ALPHONSE HUBERT, a citizen of the French Republic, and resident of Troyes, France, have invented certain new and useful Improvements in Elastic Wheels, of which the following is a specification.

This invention relates to elastic vehicle wheels, and more particularly to the means employed for relieving the shock incident to striking an object or in running over rough surfaces.

The invention also relates to the specific details of construction and arrangement of parts which will be hereinafter described and particularly pointed out in the claims.

In the drawings: Figure 1 is a longitudinal vertical section of one form of my improved elastic wheel. Fig. 2 is a section on the lines A—B and C—D of Fig. 1. Fig. 3 is a detail view of a cup or washer employed in the wheel structure. Fig. 4 is a detail sectional view of the same. Fig. 5 is a detail side elevation of a sliding block or blocks carried by the secondary axle. Fig. 6 is a front elevation of the same. Fig. 7 is a longitudinal vertical section of a different form of my invention. Fig. 8 is a front elevation of a secondary axle employed in the form of my invention illustrated in Fig. 7. Fig. 9 is a detail plan view of one of the blocks or lugs on the end of the secondary axle.

Referring particularly to Figs. 1 to 6, 30 indicates an axle, on which is mounted a cup 32, having an annular flange, 33. The cup 32 is held against a flange on the axle by a nut 31, as shown in Fig. 1. Secured to the flange 33, by bolts 42, is a washer 34, provided with an annular rib 35, which fits in a corresponding seat formed in the inner face of the cup. The washer 34, is formed on its lower portion with a concave seat 36, for a purpose to be described. Bolted to the flange 33, as at 43, is a sprocket wheel 44, by means of which power may be imparted to the wheel. 57 indicates a secondary axle, threaded at one end to receive lock nuts and at its inner end it is enlarged to form an annular flange 61, having its edges rounded to fit in the annular seat 36, formed in the washer 34. The inner end of the secondary axle is hollow to receive the free end of the axle 30 and the nut 31 thereon. The inner face of the annular flange 61 is formed with a concave seat 60 and fitting snugly therein is a rubber buffer 73 the opposite end of which fits against the inner wall of the cup 32. The inner wall of the cup 32, where the rubber buffer 73 engages, is provided with a series of ribs indicated at 38, while the concave seat 60, in the annular flange 61, is likewise provided with a series of ribs indicated at 62, whereby the said rubber buffer 73 is prevented from slipping in its seat. Near the outer end of the secondary axle 57, are longitudinal ribs 63, and fitted on said shaft is a collar 64, provided with a series of recesses to receive the ribs. Projecting from four sides of the collar 64, are trunnions 65, which receive blocks 66. The outer surfaces of the blocks 66, are convex longitudinally and transversely to permit them to have a slight rocking movement when the wheel encounters an obstacle. On the secondary axle 57, in rear of the collar 64, is a ring 68, provided with a seat to receive a washer, and also provided with a series of recesses to receive the ribs 63, to prevent the ring turning. On the inner face of the ring 68, are recesses 69, formed by ribs 70, as shown in Figs. 3 and 4. The collar 64 is held in position against the ring 68, by means of the lock nuts 72, which engage the threaded end of the secondary shaft, 57. The bolts 42 which lock the washer 34, on the cup 32, also secure a cup-shaped member indicated at 40. This member is provided on its inner end with an inwardly extended flange 45, on one face of which is formed an annular channel 46. Fitting in the channel 46, is a rubber buffer indicated at 74, the inner end of which bears against the annular flange 61, of the secondary axle 57. Fitting in pockets 46ᵃ on the outside of the flange 45, and the pockets or recesses 69, of the ring 68, are projections formed on an annular rubber buffer 71. The projections on the buffer 71 fit snugly in the pockets 69, and 46ᵃ to prevent said buffer 71 slipping. Furthermore, the projections serve to form an interlocking connection between the ring 68 and the flange 45. The outer end of the member 40, is provided with an annular outwardly extended flange 41, which fits in a recess 56, formed on a wheel box 50. The flange 41, is held in position by means of a washer 55, bolted to the wheel box by bolts 53, there being an annular rib or flange 54 on said wheel box against which the washer 55, fits. The recess 56, is considerably larger in diameter than the diameter of the flange 41, whereby the wheel box may move on said flange 41. Extending outwardly from the wheel box is a sleeve 49, which is interiorly threaded to receive a cap nut 75. The interior of the sleeve is provided with a series of ribs 67, to form guideways for the reception of the blocks 66. This construction will permit of transmission of rotary motion from the secondary axle 57, to the wheel box, at the same time the mounting of the blocks will permit the secondary axle to be tilted at an angle with reference to the shaft 30. Secured to the washer 55, by bolts 78, and to the member 40, by the fastening device indicated at 79, is a flexible dust guard 76, to prevent the entrance of dirt and foreign matter to the recess 56.

The wheel box is provided with pockets to receive the spokes 52, which are held in position by a washer 51, and bolts 53.

The operation of this form of my invention is as follows: Power is transmitted to the sprocket wheel 44, and thence to the secondary axle 57, by means of the rubber buffers 71 and 73. When the secondary axle 57 is revolved, it transmits its motion through the blocks 66 and the ribs 67 to the wheel box, so that any motion which is imparted to the sprocket wheel 44 will be transmitted to the wheel box 50. When the wheel meets an obstruction, the wheel box is vertically moved on the flange 41, which tilts the secondary axle 57, for instance as indicated by the dotted lines x—x in Fig. 1. As the secondary axle is tilted, it follows from the construction described, that the upper portion of the rubber buffers 71 and 73 will be compressed. By reason of the construction of the flange 61 the latter will rock in the seat 36, while the axle 30, remains in a horizontal position. When this movement takes place, the blocks 66 slide in direction of the shaft 30 and any irregularity in the movement of the parts is compensated for by reason of the pivotal mountings of said blocks. When the position of the secondary axle is thus distorted, the shock incident thereto is absorbed by the rubber buffers and after the obstruction is passed, these buffers will return the parts to their normal position.

The form of the invention illustrated in Figs. 7 to 9 involves the same principle as that disclosed in the invention thus far described, except in the form of the secondary axle. In these figures, the secondary axle 80 is hollow and is provided at its inner end with a flanged concave seat, between which and the cup 32, is a rubber buffer 73. The outer end of the hollow secondary axle is interiorly threaded, and on its outer surface it is provided with preferably four blocks or lugs 87, which perform the function of the blocks 66, previously described.

The outer surface of each of the blocks 87 is convex longitudinally and transversely, so as to permit of a universal movement in the guideways formed between the ribs 67. On the interior surface of the hollow axle 80 are ribs 83, which guide and retain in position a cup 82, the latter fitting in a seat formed in a nut 84 which is threaded in the end of the secondary axle. An adjusting screw is threaded in an opening 84$^a$ in the nut 84 and engages the outer end of the cup 82, whereby to adjust the tension of a spring 81. Lock nuts 85 are employed to lock the screw in set position. Interposed between the cup 82, and the cup 32, is a coil spring 81 which serves to absorb the shock and to return the secondary axle to normal position after the wheel has passed an obstruction. By employing this form of the invention, the rubber buffer 71 is dispensed with, but the operation is substantially the same.

Having now fully described my said invention what I claim and desire to secure by Letters Patent is:—

1. In combination, an axle and a wheel box, a cup on said axle and provided with a vertically disposed flange, recessed guiding means on said box slidably engaging said flange to permit relative movement of the box and cup only in the plane of the wheel, a secondary axle having a flange engaging in said cup so as to permit oscillation of said secondary axle, an elastic element interposed between said flange and said cup, and means slidably connecting the free end of said axle with said box.

2. In combination, an axle and a wheel box, a cup carried by the axle, means slidably connecting said cup and box to permit relative movement thereof only in the plane of the wheel, a hollow secondary axle provided with a flange engaging said cup, said cup having a washer for retaining said axle flange in said cup, an elastic member interposed between said axle flange and the cup, adjustable means for closing the outer end of said secondary axle, a spring interposed between said adjustable closing means and said cup, and means slidably connecting the free end of said secondary axle with said box.

3. In combination, an axle and a wheel box, a cup carried by the axle, means slidably connecting said cup and box to permit relative movement thereof only in the plane of the wheel, a secondary axle provided with a flange projecting into said cup, said cup having a washer engaging the flange of said secondary axle to retain the same, an elastic element between said cup and the flange of said secondary axle, and means slidably connecting the free end of said secondary axle with said box.

4. In combination, an axle, a cup mounted on said axle and provided with an inwardly extended flange and an outwardly extended end flange, a secondary axle resiliently mounted in the cup and adapted to move in any direction with reference to the first mentioned axle, a wheel box formed with a recess to receive the outwardly extended end flange on the cup, said wheel box having guides, and pivotally mounted blocks mounted on the secondary axle and fitting in the guides in the axle box, whereby to permit said blocks to slide in direction of the first mentioned axle.

5. In combination, an axle, a cup mounted on said axle, said cup having an internal flange and an outwardly extending end flange, a secondary axle, a resilient connection between the end of the secondary axle and one wall of the cup, a wheel box having a recess to receive the end flange on the cup, said wheel box having a centrally disposed sleeve provided with longitudinal guides, blocks mounted on the secondary axle and fitting in the guides and resilient means exerting its tension in direction of the first mentioned axle and coöperating with the before mentioned resilient connection to retain the first mentioned axle and the secondary axle in substantial alinement.

In testimony whereof I have hereunto set my hand in presence of two witnesses.

LINARD ALPHONSE HUBERT.

Witnesses:
PIERRE VILLAIN,
H. C. COXE.

Copies of this patent may be obtained for five cents each, by addressing the "Commissioner of Patents, Washington, D. C."